INVENTOR.
THEODORE A. STEHLIN
BY
EDWARD D. O'BRIAN
ATTORNEY

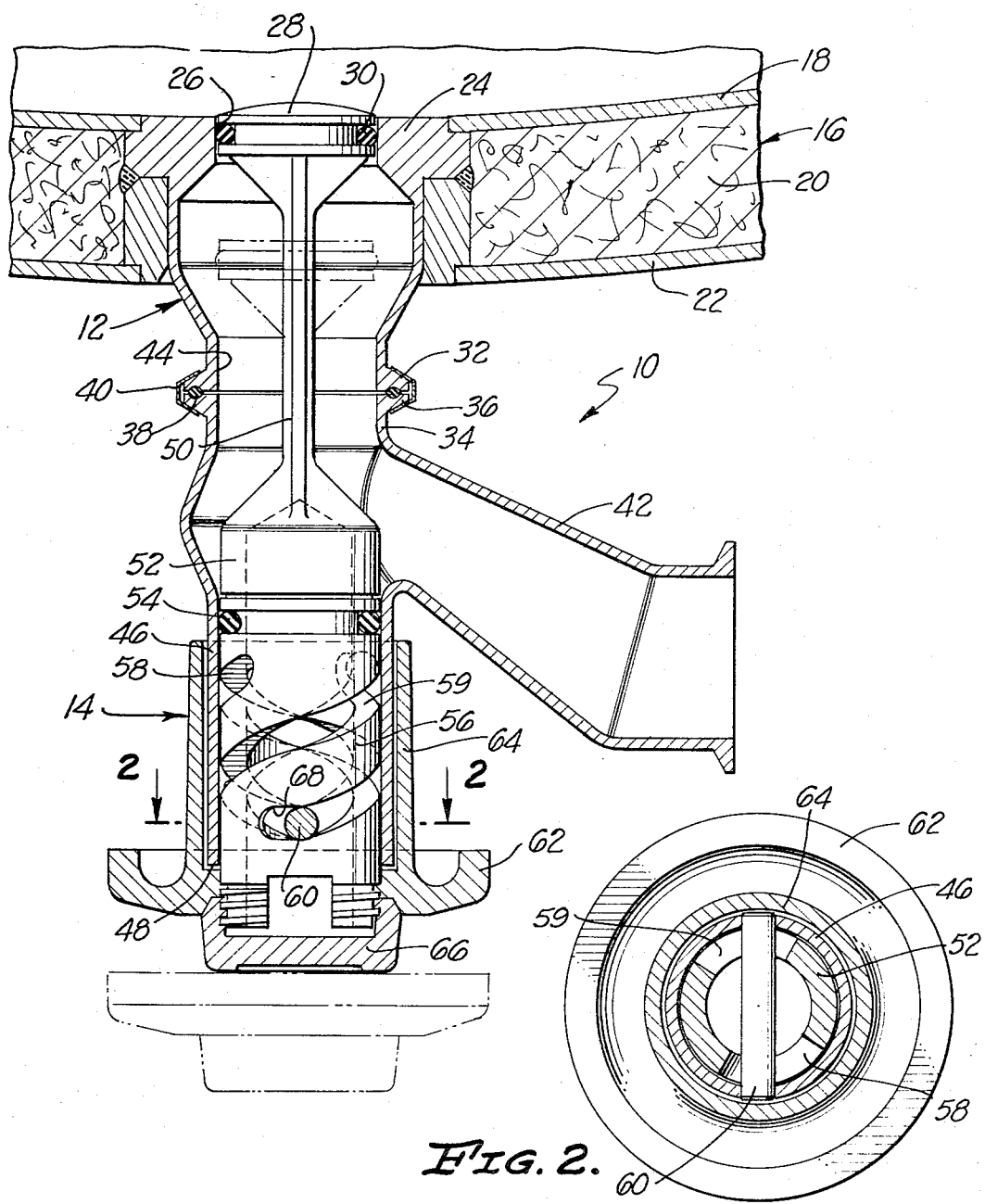

United States Patent Office 3,370,827
Patented Feb. 27, 1968

3,370,827
VALVE WITH INTERCHANGEABLE
OPERATOR
Theodore A. Stehlin, 54 Grace Walk,
Pasadena, Calif. 91105
Filed May 10, 1965, Ser. No. 454,414
3 Claims. (Cl. 251—14)

ABSTRACT OF THE DISCLOSURE

The valve is a sanitary valve characterized by its valve body presenting a face which is welded in line with a kettle interior. The valve disc, when in closed position, lies substantially in this plane so that the interior of the kettle has no dead spots which cannot be stirred. The interior of the valve is without pocket which can hold contaminants. The valve is preferably separable for cleaning so that the flange welded into the kettle represents only a small part, and the major portion of the valve including the disc and its operator can be removed for cleaning. The operator can alternatively be a helical slot which terminates in a circular slot, for manual operation or can be an interchangeable air cylinder which is also arranged to permit manual operation.

Background

This invention is directed to valve structure and particularly to valve structure which permits selective, manual or power operation of the valve and to permit interchangeability of the valve operating structures so that different natures of valves can be selectively operated.

Valves are well known for use in the control of fluid flow. Most fluid flow is confined to conduits and accordingly most valves are arranged so as to be connectable into conduits to confine fluid flow to the conduit and to control the amount of fluid flow through the conduit. The particular nature of seating surfaces varies considerably, and in accordance with this variation in seating surfaces the operators for relatively moving the seating surfaces also varies. Usually such operators are dependent upon the nature of the signal for which a valve actuation is desired. However, once a valve is built it is difficult to change from one operating means to another.

Accordingly, it is an object of this invention to provide a valve structure which is capable of accepting different operators so that the nature of the means by which the valve is actuated can readily be interchanged.

It is another object of this invention to provide a selective valve operator which in accordance with the requirements of the moment can either be operated manually or through fluid means.

It is another object of this invention to provide valve structure which is economic to manufacture in that the valving structure and the valve operating structure can be separately manufactured and separately stocked and then assembled on order that a great many variations and combinations of valve structure and valve operating structure can be readily available from a minimum of stock.

It is a further object of this invention to provide valve structure which is economic to manufacture, easy to assemble and of trouble free life so as to provide best economic considerations.

Other objects and advantages of this invention will become apparent from a study of the following portion of this specification, the claims and the attached drawings in which:

FIG. 1 is a sectional view taken generally along the center line of the preferred embodiment of the valve of this invention showing the valve connected to the wall of a kettle;

FIG. 2 is a section taken along the line 2—2 of FIG. 1;

Summary

Figure 3:
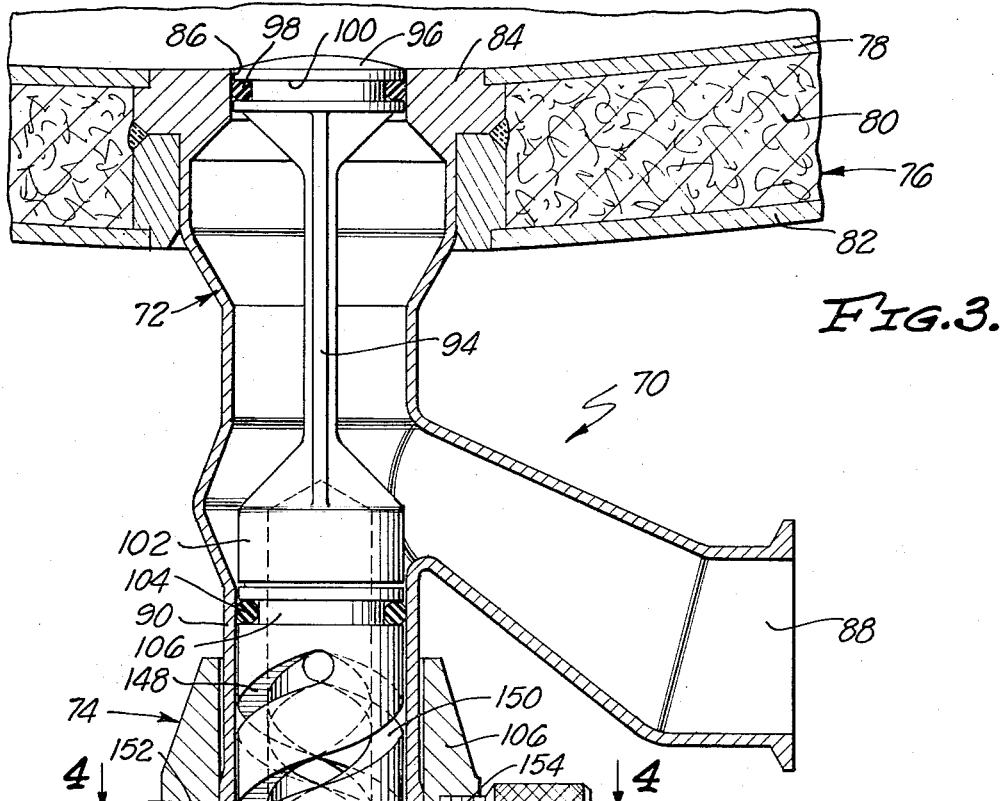
FIG. 3 is a sectional view generally taken along the center line of another embodiment of the valve of this invention.

As an aid to understanding this invention it can be stated in essentially summary form that it is directed to valve structure. The valve structure comprises both a valving structure and valve operating structure. The valving structure has means to selectively permit or inhibit the flow of fluid through a conduit and the valve operating structure comprises manual means, in the preferred embodiment, which includes a high pitch spiral which is directly connected to the valving structure so that axial motion of the spiral valve structure controls the valving operation. The manual means controls the rotation of the spiral and thus its axial movement. A pin through the spiral and secured in the body of the valve operating structure causes this axial motion upon rotation of the spiral. In an alternative embodiment, a fluid pressure operated cylinder means is connected to permit relative reciprocation of the valve structure so that valving is controlled by the fluid cylinder means. In this embodiment, manual means connected to the fluid pressure operated means permits manual actuation. Accordingly, several different manually operable valve operating structures can be installed upon a valve body.

Description

This invention will be understood in greater detail by reference to the following portion of this specification wherein the drawings are described. Referring now to FIGS. 1 and 2, the preferred embodiment of the valve structure of this invention is generally indicated at 10. The valve structure 10 comprises a valving portion 12 and a valve operating portion 14.

In order to illustrate the manner of use of valve structure 10, it is shown in an illustrative environment. Kettle 16 is of such nature as to have a hemi-cylindrical lower portion, the inside wall of which is indicated at 18. Kettle 16 is provided with insulation 20 and insulation jacket 22 to protect the insulation 20 from adverse effects. Valve seat member 24 is secured in the inner kettle wall 18 preferably at the bottom thereof and preferably in a permanent manner such as by welding. Valve seat member 24 provides a smooth juncture with the inner wall 18. Valve seat member 24 contains cylindrical valve seat 26 which is engaged by valve disc 28 for closure thereof. Seal ring 30 is provided in a suitable groove in valve disc 28 so that proper sealing engagement with valve seat 26 provides full seal and closure of the valve structure 10. Valve seat member 24 extends out of the insulation jacket 22 and is sealed with respect thereto. It terminates in conical flange 32.

Outlet member 34 and valve seat member 24 together comprise the valve body of valve structure 10. Outlet member 34 has a conical flange 36 positionable adjacent conical flange 32, and sealed with respect thereto by means of ring seal 38. Clamp 40 engages around the conical flanges 32 and 36 so as to maintain the flanges together and maintain the valve body in one piece. This flange clamp structure is such that the valve structure 10 may be easily disassembled for inspection, repair and cleaning.

Outlet member 34 carries outlet nozzle 42 which is suitably connectable to piping to receive fluid materials through the opening defined by valve seat 26 and the interior 44 of valving portion 12 when the valve disc is in the open position shown in dotted lines in FIG. 1. Outlet member 34 also carries sleeve 46 which is integrally formed therewith. Sleeve 46 is of cylindrical tubular form and terminates in outer end 48 which is planar at right angles to the axis of tubular sleeve 46.

While sleeve 46 is integrally formed with valving portion 12 and with the remainder of the body of valve 10, it is a portion of the valve operating structure and serves to transmit forces between the valving portion and the valve operating portion. Valve disc 28 is carried upon elongated, flexible valve stem 50 which is formed as a portion of valve plunger 52. Plunger 52 carries a suitable groove in which ring seal 54 is positioned, and ring seal 54 engages on the interior of sleeve 46 to be in sealing engagement therewith. Accordingly, fluid is restrained from entering into the interior of sleeve 46 beyond ring seal 54, and is contained in the passages formed by interior 44 and nozzle 42. Valve plunger 52 has an outer surface 56 which is in close engagement with the interior surface of sleeve 46 but permits movement of valve plunger 52 with respect to sleeve 46.

Helical slots 58 and 59 are formed in the portion of valve plunger 52 beyond ring seal 54. Pin 60 is engaged through helical slots 58 and 59. Pin 60 is engaged in suitable holes through the sleeve 46, so that it is retained in position. Thus, rotation of valve plunger 52 with respect to sleeve 46 causes relative axial motion therebetween.

Manually operable valve handle 62 is engaged upon the end of valve plunger 52 that extends beyond the end 48 of sleeve 46. For convenience of retention of pin 60, valve handle 62 has skirt 64 which extends down over the outside of sleeve 46 to cover the ends of pin 60. Cap 66 retains valve handle 62 upon valve plunger 52.

It is seen that valve disc 28 forms relatively smooth bottom within the kettle 16 and nearly corresponds in curvature to the inner kettle wall 18, when in the closed position. Thus, the kettle can be stirred and there are no dead spots of material in it. Sealing is accomplished by means of ring seal 30 engaging in valve seat 26, and valve stem 50 has sufficient flexibility so as to permit the valve disc 28 to properly align itself within the valve seat.

It is to be noted the helical slot 58 terminates in flat 68 and the similar flat in slot 59. These flats have surfaces in planes perpendicular to the axis. This permits locking of the valve structure 10 so that axial forces upon valve disc 28 do not tend to cause rotative forces of valve handle 62. Therefore, when the valve is closed to the point where pin 60 engages upon the flat 68, the only force that can open it is the rotation of manual valve handle 62.

Rotation of manual valve handle 62 causes rotation of valve plunger 52 with respect to sleeve 46. Since pin 60 is mounted in sleeve 46, the rotation of valve plunger 52 causes the valve plunger to move axially in accordance with the dictates of the helical slot 58. Thus, valve disc 28 is withdrawn out of valve seat 26 into the enlarged portion of the interior 44, as is shown in dotted lines. Thus, the valve is opened to permit fluid to move from the kettle 16, through the valve and out of the outlet nozzle 42. During such discharge operation ring seal 54 keeps the fluid formerly in the kettle from entering into the portion of valve structure 10 which contains the valve operating portion 14. The three part fitting comprising flanges 32, 36 and clamp 40 permits easy disassembly and removal of a portion of the valve 10 for cleaning of the valve, the kettle and the associated piping.

Figure 4:
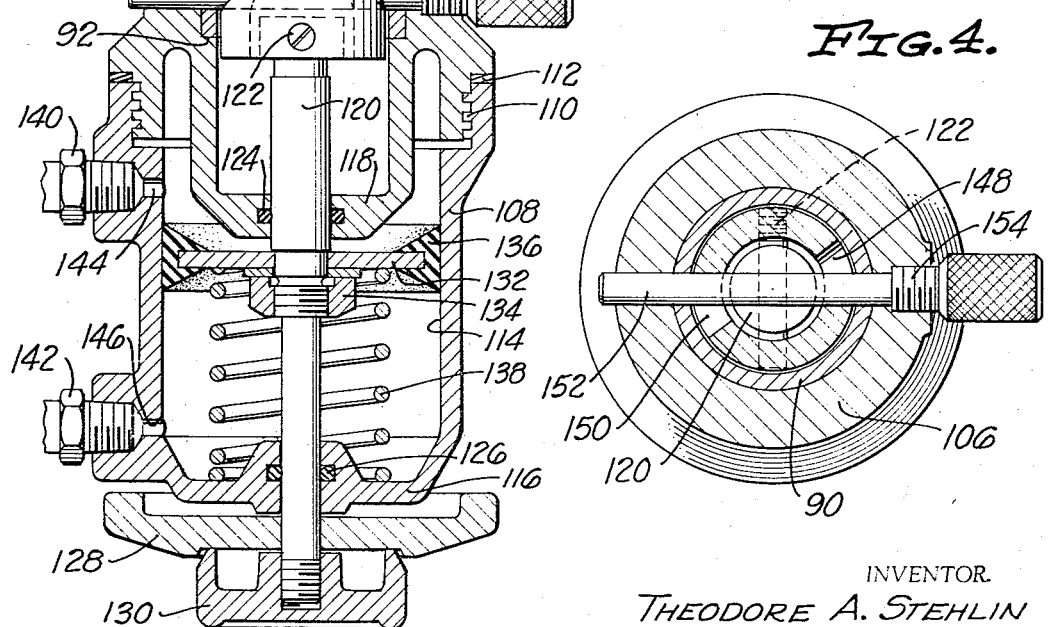
FIG. 4 is a section taken generally along the line 4—4 of FIG. 3.

Referring now to FIGS. 3 and 4, another embodiment of valve structure is shown therein. The valve structure of FIGS. 3 and 4 is generally indicated at 70 and comprises valving portion 72 and valve operating portion 74.

The valving portion 72 is quite similar to the valving portion 12 of valve 10. The valve 70 is shown in association with a kettle 76 having an inner wall 78, insulation 80 and an insulation jacket 82. Valve seat member 84 is secured in fluid tight relationship within the inner wall 78 of the kettle and is substantially flush on the inner side thereof. Valve seat 86 provides an opening through valve seat member 84 into the interior of valving portion 72. Valving portion 72 has a continuously open interior which is connected for fluid flow to outlet 88. Valve 70 has cylindrical sleeve 90 which is axially aligned with valve seat 86. Thus, the described structure of valve 70 is similar to the structure of valve 10, except for the fact that the valve 10 is divisible while the valve body of valve 70 is of unitary construction. Preferably the overall length of the valve body from valve seat member 84 to the outer end 92 of sleeve 90 is equal to the dimension from valve seat member 24 to outer end 48 of valve 10. This provides interchangeability of the interior structure and accessory structure thereof.

Similarly to valve 10, valve 70 has a thin, flexible elongated stem 94 which carries disc 96 on the end thereof. Disc 96 carries ring seal 98 in groove 100 so that ring seal 98 can be in engagement with valve seat 86 to provide fluid sealing. Stem 94 is sufficiently flexible to provide sealing within seat 86 even though slight misalignment occurs in the valve operating structure 74.

Valve plunger 102 has a generally cylindrical exterior configuration and fits closely within the interior of sleeve 90. Ring seal 104 in groove 106 engages with the interior wall of sleeve 90 to provide sealing and to prevent fluid from escaping out of outer end 92.

Cylinder mounting bracket 106 is mounted around the outer end of sleeve 90 to be in engagement therewith and in engagement with the outer end 92 thereof. Cylinder 108 is threadedly mounted upon cylinder mounting bracket 106 by means of threads 110 which are sealed by means of gasket 112. Cylinder 108 has an interior cylindrical wall 114 and an outer wall 116. The inner end wall of cylinder 108 is formed by wall 118 on cylinder mounting bracket 106.

Piston rod 120 is irrotatably mounted in the outer end of valve plunger 102 by means of screw 122. Piston rod 120 passes through a piston rod opening in the wall 118 and is sealed with respect thereto by ring seal 124. Piston rod 120 also passes through outer end wall 116 and is sealed with respect thereto by means of ring seal 126. The outer end of piston rod 120 irrotatably carries hand wheel 128 which is secured thereto by means of nut 130.

Piston 132 is mounted upon piston rod 120 and is secured thereto by means of nut 134. Seal ring 136 is mounted upon piston 132 and sealingly and slidingly engages cylinder wall 114. Compression spring 138 is engaged between wall 116 and piston 132 so as to urge the piston rod 120 upward, as is seen in FIG. 3. Fluid pressure connections 140 and 142 are located in bosses in cylinder 108 and are adapted to connect to suitably controlled sources of fluid pressure. Pressure connections 140 and 142 are open to the interior of cylinder 108 by means of ports 144 and 146, which enter on opposite sides of piston 132. Thus, the entry of fluid under pressure into port 144 with a simultaneous exhaust thereof at port 146 will urge piston 132 downward. Similarly, the introduction of fluid under pressure at port 146 with the exhaust thereof at port 144 will urge the piston 132 upward. Air is preferred as the fluid pressure medium.

The end of valve plunger 102 away from valve disc 96 is provided with first and second spiral slots 148 and 150. These slots extend diametrically opposite each other, are suitable sloped for the purpose intended and extend to a sufficient extent to permit adequate movement and proper positioning of disc 96. Pin 152 extends through suitable openings in sleeve 90, through the spiral slots 148 and 150 and through the cylinder mounting bracket 106 so as to secure these parts together. Pin 152 is preferably threaded into cylinder mounting bracket 106 by means of threads 154 for the retention of pin 152 therein.

From this construction it can be seen that rotation of hand wheel 126 by manual effort can rotate piston rod 120, valve plunger 102 and disc 96 so as to cause relative motion of valve plunger 102 with respect to sleeve 90. Such relative rotation, together with pin 152 acting in spiral slots 148 and 150 causes axial motion of the entire movable structure. This spiral slot causes withdrawal of valve plunger 102 to cause disc 96 to move away from valve seat 86 into the enlarged interior of the upper body of valving portion 52. Thus, an opening is created from the interior of kettle 76 to outlet 88. Opposite manual effort similarly closes off the valve by returning disc 96 into valve seat 86. The slope of the spirals 148 and 150 is such that normal pressures within kettle 76 do not cause rotation of valve plunger 102.

When it is desired to operate valve 70 by fluid means, suitable application of fluid under pressure to either port 144 or 146 causes motion of pistons 132. The slope of spirals 148 and 150 is such that adequate force upon the piston 132 can cause rotation of valve plunger 102. Thus, the valve 70 can be either manually or fluid pressure operated.

It is to be noted that sleeves 46 and 90 are identical, and it is preferred to fashion valving portions 12 and 72 of the same dimensions. Thus, the entire valve operating portions 14 and 74 can be interchangeable. In such a case the only difference between the valves 10 and 70, considering the interchangeability of the valve operating portions 14 and 74, is the disconnectability of the bodies thereof adjacent the kettle. In some cases such disconnectability is desirable, as is illustrated in FIG. 1, and in other cases the structure may be unitarily formed as is illustrated in FIG. 3.

This application having been described in its preferred embodiment, and an alternative embodiment also described, it is clear that this invention is subject to numerous modifications and changes within the spirit of the invention and without the exercise of the inventive faculty. Accordingly, the scope of this invention is defined by the scope of the following claims.

I claim:
1. A valve, said valve comprising:
  a valving portion and a valve operating portion;
  said valving portion comprising a valve seat and a valve disc movable with respect to said valve seat and engagable with said valve seat so that said valve disc closes off fluid communication through said valve seat;
  said valve operating portion comprising a sleeve, said said sleeve having an internal substantially cylindrical surface having an axis, a plunger mounted within said sleeve and movable along said axis, said plunger being connected to said valve disc so as to move said valve disc relative to said valve seat, a spiral slot in said valve plunger, a pin extending through said slot and positioned within said sleeve so that rotation of said plunger with respect to said sleeve causes motion of said plunger along said axis, a cylinder, said cylinder having an axis substantially parallel to said axis of said sleeve, a skirt secured to said cylinder, said skirt being secured to said sleeve so as to maintain said axes substantially coaxial, said pin extending through said skirt, said cylinder having an internal cylindrical surface, a rod in said cylinder, said rod being sealed with respect to said cylinder so as to inhibit leakage of fluid from said cylinder, said rod being connected to said plunger, a piston secured to said rod and engaging said cylindrical wall of said cylinder, means to supply fluid into said cylinder so as to urge said piston to move in said cylinder and manual means on said rod so that said valve disc can be operated by said manual means and by motion of said piston.
2. The valve of claim 1 wherein said pin is removable from its position through said skirt, through said sleeve and through said slot in said plunger.
3. A valve, said valve comprising:
  a valving portion and a valve operating portion, said valve having a body connecting said valving portion and said valve operating portions;
  said valving portion comprising a valve seat member adapted to be secured in fluid tight arrangement within the bottom of a kettle, a circular valve seat within said valve seat member, said valve seat member forming a part of said body of said valve, said body having an interior opening thereof and having an outlet, said interior opening extending from said valve seat to said outlet, a valve disc movable into association with said valve seat, a seal ring around said valve disc so as to seal said valve disc with respect to said valve seat when said valve disc is in sealing relationship with said valve seat, said valve seat having an axis, said valve disc having an elongated, flexible valve stem, said valve stem lying substantially on said axis;
  said valve operating portion comprising a sleeve on said body, said sleeve having a substantially cylindrical interior surface which is substantially axially aligned with said axis, a plunger within said sleeve, a seal ring on said plunger and in sealing engagement with said plunger and said sleeve, said valve stem being secured to said plunger, first and second spiral slots in said plunger, a piston rod irrotatably secured to said plunger and extending away from said valve stem on said plunger, a manual hand wheel on said piston rod, said manual hand wheel being arranged so that said plunger can be manually rotated with respect to said sleeve, a cylinder mounting bracket mounted on said sleeve, said cylinder mounting bracket extending around said piston rod and being sealed with respect thereto, a pin passing through said cylinder mounting bracket, said sleeve and said first and second spiral slots in said plunger so that rotation of said manual hand wheel causes axial motion of said disc with respect to said valve seat, a fluid cylinder having a substantially cylindrical interior surface mounted on said cylinder mounting bracket, said fluid cylinder being sealed with respect to said piston rod, a piston sealingly mounted upon said piston rod and a seal ring around said piston sealingly engaging said piston and said substantially cylindrical interior cylinder surface, first and second fluid connections connected to said cylinder and open to the cylindrical interior through ports, said ports being located on opposite sides of said piston so that introduction of fluid under pressure into one of said ports causes motion of said piston and piston rod with respect to said cylinder and causes motion of said valve disc with respect to said valve seat, and a spring positioned between said cylinder and said piston to urge said piston in such a direction as to move said valve disc into sealing relationship with said valve seat.

References Cited
UNITED STATES PATENTS

| | | | |
|---|---|---|---|
| 363,763 | 5/1887 | Puffer | 251—144 X |
| 2,530,433 | 11/1950 | Jaegle | 251—144 X |
| 3,103,341 | 9/1963 | Moran | 251—144 X |
| 2,320,011 | 5/1943 | Reynolds | 251—14 X |
| 2,782,800 | 2/1957 | Hillebrand | 251—218 X |
| 3,062,496 | 11/1962 | Stehlin | 251—324 X |
| 3,226,079 | 12/1965 | Shaw et al. | 251—218 |

FOREIGN PATENTS

| | | |
|---|---|---|
| 575,091 | 5/1959 | Canada. |
| 1,233,159 | 5/1960 | France. |
| 1,284,711 | 11/1962 | France. |

M. CARY NELSON, *Primary Examiner.*

A. ROSENTHAL, *Assistant Examiner.*